United States Patent [19]
Okudaira et al.

[11] 3,966,892
[45] June 29, 1976

[54] PROCESS FOR PRODUCING TITANIUM DIOXIDE

[75] Inventors: Shigenori Okudaira; Michiaki Iwakami; Takefumi Iriye, all of Chigasaki, Japan

[73] Assignee: Nippon Mining Co., Ltd., Tokyo, Japan

[22] Filed: Nov. 13, 1974

[21] Appl. No.: 523,454

[52] U.S. Cl................................. 423/613; 423/659
[51] Int. Cl.².......................................... C01G 23/04
[58] Field of Search............................ 423/613, 659

[56] References Cited
UNITED STATES PATENTS

| 2,789,886 | 4/1957 | Kraus................................. 423/613 |
| 2,909,409 | 10/1959 | Gregory.............................. 423/613 |
| 3,022,137 | 2/1962 | Nelson................................ 423/613 |
| 3,361,525 | 1/1968 | DeRycke et al................. 423/613 X |
| 3,485,584 | 12/1969 | Zirngibl et al..................... 423/613 |
| 3,615,202 | 10/1971 | Stern et al. ........................ 423/613 |

FOREIGN PATENTS OR APPLICATIONS

| 285,132 | 4/1965 | Australia............................. 423/613 |

Primary Examiner—Edward Stern
Attorney, Agent, or Firm—Oblon, Fisher, Spivak, McClelland & Maier

[57] ABSTRACT

Titanium dioxide is produced by a continuous gaseous oxidation of titanium tetrachloride or a titanium tetrachloride containing gas with oxygen or an oxygen containing gas, the improvement wherein both of said gases are separately preheated and the titanium tetrachloride or titanium tetrachloride containing gas is fed downwardly into the reactor from a burner equipped with a cooling jacket disposed at the upper part of the reactor and the oxygen or oxygen containing gas is fed downwardly through the burner into the reactor for reaction with titanium tetrachloride; and simultaneously, an inert gas and inert refractory particles are injected from the lower part of the reactor toward the inner wall of the reactor so that the inert refractory particles are caused to rise upwardly as a suspension, and the upward flow of the suspension is countercurrently contacted with the downwardly flow of the reaction product so as to rapidly cool the reaction product, and wherein the inert refractory particles injected upwardly are impinged on the inner wall of the reactor so as to prevent the deposition of titanium dioxide.

5 Claims, 2 Drawing Figures

PROCESS FOR PRODUCING TITANIUM DIOXIDE

BACKGROUND OF THE INVENTION

1. Field of the Invention

The present invention relates to a process for producing titanium dioxide by oxidizing titanium tetrachloride in the gaseous phase at high temperature.

2. Description of the Prior Art

In the preparation of titanium dioxide having suitable characteristics for use as a pigment by the gaseous oxidation of titanium tetrachloride, the following conditions are required:

1. The temperature of the titanium tetrachloride and oxygen in the reaction zone should be high enough to produce the oxidizing reaction.
2. The time from the initiation of the reaction to its finish should be made as short as possible. In the continuous reaction of gaseous titanium tetrachloride and oxygen, the reaction zone should be kept as small as possible.
3. The product should be rapidly and uniformly cooled after the finish of the reaction.

In the practice of the preparation of titanium dioxide by gaseous oxidation, several difficulties are known to occur. When the reaction zone is minimized by raising the temperature of the pre-mixed raw material gases in order to satisfy conditions (1) and (2), the resulting titanium dioxide is deposited in the burner, or on the inner wall of the reactor, thereby closing the passage to the reactor. Moreover, the deposited particles of titanium dioxide become rough whereby they are not suitable for use as a pigment. Regarding condition (3), when the resulting titanium dioxide is not rapidly and uniformly cooled after the oxidation to lower than 1000°C, preferably lower than 800°C, the resulting titanium dioxide particles become enlarged whereby they are not suitable for use as a pigment. Heretofore, in order to overcome these difficulties, there has been proposed the employment of a method of utilizing a down-flowing cascade of incandescent rough particles of titanium dioxide while burning titanium tetrachloride with oxygen as a jet current in a substantially vertical, upward direction, in a reaction zone surrounded by said down-flow; or a method of impinging fine particles on a reactor wall that is accessible to the reactants and is adjacent to the raw material gas inlet of the reactor. However, the following disadvantages have been found in the known methods:

In the former method, some of the titanium dioxide resulting from the reaction adheres to the surface of the rough particles of the down-flowing titanium dioxide, forming a coating thereupon, whereby the yield of the reaction product of titanium dioxide is decreased. Accordingly, it is necessary to recover the titanium dioxide from the rough particles having such coatings by recycling them through a chlorination step. In this method, the reaction product is excessively cooled by suspending the fine particles in a carrier gas. This tends to slow the reaction. Also, since the fine particles impinge upon a portion of the reactor which is adjacent to the raw material gas inlet, damage or abrasion of the raw material gas inlet may result, thereby requiring substantial apparatus maintenance. In order to rapidly cool the resulting titanium dioxide, several methods have been proposed: indirectly cooling by heat exchange on a cool surface; introduction of cool inert particles to rapidly cool the product followed by separation from the product and recycling, and use of an inert cooling gas. The latter method of using an inert cooling gas has special advantages in that it requires no special apparatus and is effective with a low failure rate. However, these methods have the disadvantages of requiring an increased volume of gas and requiring an increase in the size of the apparatus in order to accommodate the cooling and separating steps. It would be desirable to provide a cooling method which would permit a substantial reduction in volume of cooling gas required.

SUMMARY OF THE INVENTION

Accordingly, it is an object of the present invention to provide a process for producing pigment grade titanium dioxide by continuous reaction of gaseous titanium tetrachloride and oxygen without deposition of the titanium dioxide reaction product onto the raw material gas inlet, or onto the inner walls of the reactor.

It is another object of this invention to provide a method of rapidly cooling the product titanium dioxide produced by said process without the use of excessive quantities of cooling gas.

These and other objects of this invention, as will hereinafter be made more clear by the discussion below, have been attained by (1) reacting the gases of titanium tetrachloride and oxygen by down-flowing both of the preheated gases into the reactor by feeding them separately through a burner equipped with a water cooling jacket made of metal, and (2) injecting upwardly an inert gas and inert refractory particles from the bottom of the reactor through a nozzle having a small diameter toward the inner wall of the reactor, whereby the injected flow is impinged upon the particles of the reaction product which are counter-currently flowed downwardly.

The inert refractory particles injected upward with the inert gas are entrained in the current of the inert gas and are raised by inertia so as to impinge upon the inner wall of the reactor. This prevents the deposition of the titanium dioxide reaction product onto the walls of the reactor.

A burner equipped with a water jacket made of metal is used to feed the gaseous reactants, whereby the deposition of the reaction product around the burner is substantially prevented through a slight decrease in temperature of the reactant gases.

The present invention has successfully achieved and provides a process for producing titanium dioxide by continuously feeding titanium tetrachloride or a titanium tetrachloride containing gas and oxygen, or an oxygen containing gas, to oxidize the titanium tetrachloride in the gaseous phase. This process comprises preheating the chloride and the oxidizing gas and feeding both gases separately through a burner equipped with a water jacket into the upper part of a reactor; reacting both gases by flowing them downwardly into the reactor; injecting the suspension of an inert gas and inert refractory particles from the bottom of the reactor toward the inner wall of the reactor thereby causing the particles to flow upwardly; impinging and mixing the upward flow of the particles with the reaction product flowing counter-currently so as to rapidly cool the reaction product; and impinging the inert refractory particles onto the inner wall of the reactor so as to prevent the deposition of the reaction product.

DETAILED DESCRIPTION OF THE PREFERRED EMBODIMENTS

Figure 1:
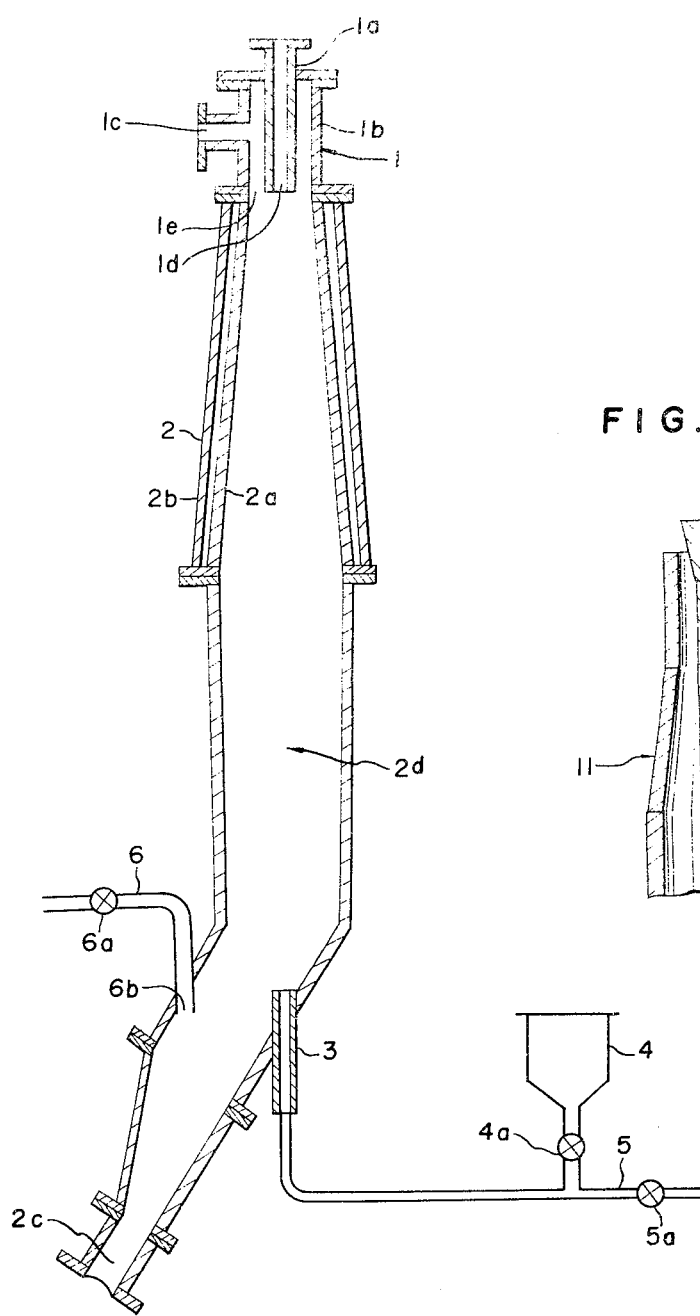
FIG. 1 is a sectional view of one embodiment of a reactor used for the present invention.

The reactant gases used in this invention are titanium tetrachloride or a titanium tetrachloride containing gas and oxygen or an oxygen containing gas. The reactant gases are separately preheated and passed into the reactor through a burner equipped with a water cooling jacket made of metal which is disposed at the top of the reactor. The preheating temperature of both of the gases is preferably high enough to yield a temperature greater than 700°C when the gases are mixed in the reactor. The gas mixture is flowed downwardly into the reactor wherein the reaction of the gases is effected and completed. The reactor is further extended in the downward direction beneath that portion in which the reaction is completed. A nozzle having a small diameter is equipped at the bottom. The inert refractory particles are suspended by passing the inert gas upwardly through the nozzle. If desirable, a portion of the inert gas is separately injected from a second nozzle. The fine inert refractory particles are injected in the direction of the wall of the reactor so as to prevent direct impingement on the gas inlet or the burner. Since they are impinged onto the wall of the reactor at an acute angle, abrasion of the wall is negligible.

The inert gas used in the invention can be broadly selected from any of those gases which will not react with the reaction product or with the reactant gases under the conditions of mixing or contact. Suitable inert gases include nitrogen, oxygen, air, chlorine, carbon dioxide or a mixture thereof. When the discharge gas from the oxidation step is to be used for chlorination of the titanium oxide containing material, it is advantageous to use recycled gas discharged from the oxidation step.

The inert refractory particles used in this invention should be substantially unchanged upon contact with titanium tetrachloride, oxygen, chlorine gas or titanium dioxide, and should have good thermal resistance and good mechanical strength. Suitable refractory particles having such characteristics include certain oxides, such as alumina, silica, tatania, zirconia, etc. The diameter of the inert refractory particles is preferably in the range of about 0.1 - 5 mm, and the type of particles used are selected on the basis of their specific gravity, the injection velocity, the size of the reactor, and the velocity of the reaction product flowing downwardly in the reactor. The particles are preferably spherical in shape or have rounded corners so as to decrease abrasion of the nozzle.

In the preparation of pigment grade titanium dioxide by gaseous oxidation of titanium tetrachloride, it is necessary after the reaction to rapidly cool the product to lower than 1000°C, preferably lower than 800°C, in order to prevent the growth of the resulting titanium dioxide particles which could adversely affect the quality of the particles for pigment purposes. In this invention, as stated above, the reaction product is rapidly cooled by injecting an inert gas together with inert refractory particles through a nozzle situated at the bottom of the reactor or by injecting the inert gas partially from the bottom and partially from a secondary nozzle portion. The inert gas injected upwardly is counter-currently impinged on the suspended flow of the reaction product in order to cool the same effectively and uniformly. Contrary to the conventional method which requires a large amount of gas for rapid cooling, in this invention, uniform and rapid cooling can be attained by a relatively small amount of inert gas, since the reaction product is rapidly cooled by counter-currently impinging the flow of the inert gas onto the flow of the reaction product.

In the invention, the inert refractory particles of the carrier gas also impart a cooling effect similar to that of a coolant gas. Accordingly, the amount of total gases fed into the high temperature zone of the reactor can be quite smaller than that of the conventional process. Because the inert gas is injected into a reactor having a large diameter compared to that of the nozzle, the inert gas velocity becomes low and the gas does not reach the reaction zone. Accordingly, there is no difficulty with any reaction caused by the cold inert gas. According to the inventor's results, the velocity of the inert gas was still remarkably decreased at a distance of only 30–50 cm from the head of the nozzle.

On the other hand, the inert refractory particles injected with the inert gas in the form of a suspension are raised higher by inertia in the reactor whereby the particles are impinged on the inner wall of the reactor to prevent the deposition of titanium dioxide onto the wall.

The inert refractory particles impinged on the inner wall of the reactor flow downwardly together with the suspension of the reaction product and can be discharged from the bottom of the reactor with the inert gas. When the outlet pipe is disposed at a suitable place on the side wall of the reactor, the flow of the suspension of the reaction product and the inert refractory particles which are flowing in a downwardly direction is counter-currently contacted with the flow of the inert gas flowing upwardly from the bottom of the reactor. This separates the reaction product from the inert refractory particles. The inert gas and the reaction product can be discharged from the outlet pipe and the inert refractory particles can be discharged from the bottom of the reactor. The inert refractory particles discharged from the bottom of the reactor can be recycled for reuse.

Alternatively, the inert refractory particles are not discharged but are stored at the bottom of the reactor and the particles are sucked from a suction inlet, which is located on the inert gas injection nozzle at the side wall, by a venturi effect, and then the particles are accelerated in the nozzle and are injected with the inert gas.

The initial velocity of the inert refractory particles upon injection should be the velocity required for raising the particles counter-currently against the down flow of the suspension of the reaction product flowing downwardly in the reactor. On this point, the distance for injection is small in a small size apparatus. The initial velocity of the injection can be low. However, in a large apparatus, the distance for injection should be long. Especially when a double cylindrical type burner is used, the velocity of the reaction gas should be high. Accordingly, in order to attain the same effect as that in a small size apparatus, it is sometimes necessary to produce an initial velocity greater than 150 m/sec.

Although the amount of inert refractory particles needed to obtain the objective can be relatively small, as a practical matter, it is necessary to use more than 10 wt%, preferably more than 30 wt%, based on the weight of the resulting titanium dioxide in order to effectively prevent the deposition of the resulting titanium dioxide. The inert gas used for injecting the inert refractory particles is contacted with the resulting titanium dioxide at the stage of the completion of the reaction, whereby adhesion of the resulting titanium dioxide to the inert refractory particles and excess cooling of the reaction product can be prevented.

When a burner, equipped with a water cooling jacket, is used at the inlet of the reactant gases, deposition of the resulting reaction product around the inlet does not substantially occur and abrasion of the burner is prevented. The surface of the burner, equipped with the water cooling jacket, which is contacted with the titanium tetrachloride, is covered with carbon so as to expose a water cooled metal surface only at the top of the burner. This minimizes the decrease in temperature of the reaction product and thus deposition of the titanium dioxide at the top of the burner is prevented.

Figure 2:
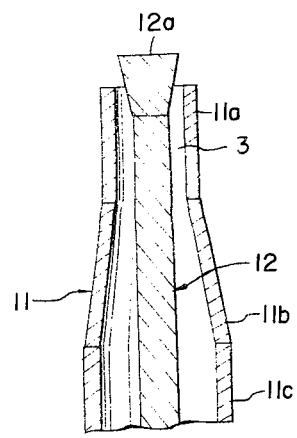
FIG. 2 is a sectional view of one embodiment of a nozzle for injecting an inert gas and inert refractory particles into the reactor of FIG. 1.

The operation of the process of this invention will now be illustrated by referring to FIGS. 1 and 2 of the apparatus. FIG. 1 is a sectional view of one embodiment of the reactor used for the process of the invention, wherein the preheated titanium tetrachloride and the preheated oxygen are fed from the burner (1) to the reaction zone which is formed in the reaction chamber (2) connected to the lower part of the burner (1). The outlet (2c) of the resulting reaction product and the inert gas is disposed at the bottom of the reaction chamber. The inert refractory particles carried with the inert gas are injected through the inlet pipe (3) at the bottom of the reaction chamber and the particles are supplied from the storage tank (4) while the inert gas is fed through the pipe (5). The burner comprises an inner metal tube equipped with a water cooling jacket (1a); an outer metal tube equipped with a water cooling jacket (1b) and an oxygen feed pipe (1c). The inner tube (1a) and the outer tube (1b) form a coaxial double tube, and the oxygen feed pipe (1c) is disposed at the side surface of the outer tube (1b) of the burner. The preheated titanium tetrachloride is passed through the inner tube (1a) of the burner and is injected into the reaction chamber from the nozzle for the titanium tetrachloride at the lower end of the tube (1d). The preheated oxygen is passed through the oxygen feed pipe (1c) and the space between the inner tube (1a) and the outer tube (1b) and is injected from the oxygen outlet (1e) into the reaction chamber. The reaction chamber is formed with double walls made of stainless steel, and cool water is passed through the space between the inner wall (2a) and the outer wall (2b) whereby the inner wall is protected by cooling so that it remains durable in the high temperature corrosive atmosphere. The titanium dioxide impinging on the inner wall is thus kept soft so that its deposition is easily prevented by the inert refractory particles. The coolant medium can be an oily heat conductive material.

An opening (2c) is formed at the bottom of the reaction chamber, and both the flow of the reaction product and that of the inert gas flow through the opening to a cooling apparatus (not shown). The particles inlet pipe (3) is disposed at the bottom of the reactor in a vertical direction so as to position its opening at the top. Control of the feeding rates of the inert refractory particles and the inert gas to the particles inlet pipe (3) is performed by rotation of the rotary feeder (4a) disposed at the lower part of the particles storage tank (4) and the flow control valve (5a) disposed at the inert gas pipe (5). When only part of the inert gas for cooling the reaction product is used for injecting the inert refractory particles, the remainder of the inert gas is fed from another pipe (6) through the valve (6a) to another gas inlet disposed at the bottom of the reactor (6b). FIG. 2 is a sectional view of one embodiment of the nozzle for injecting a suspension of the inert refractory particles and the inert gas. In FIG. 2, the suspension is passed through a space between the outer tube (11) and the rod (12) inserted at the center. The inner diameter at the position (11c) is selected so as to determine the velocity for feeding the suspension. The inner diameter at the position (11b) is decreased in order to provide a sectional area needed for producing the desirable velocity of the suspension at the position (11a). The head of the central rod (12a) has a conical shape enlarged upwardly so as to prevent direct impingement on the head of the burner by curving the flow of the injected particles. The particle inlet pipe should be made of high alumina ceramic, hard steel, tungsten carbide or other abrasion resistant material.

The above-mentioned apparatus is only one embodiment used for the process of the invention.

Having generally described the invention, a more complete understanding can be obtained by reference to a certain specific example, which is included for purposes of illustration only and is not intended to be limiting unless otherwise specified.

EXAMPLE

Titanium dioxide was prepared by gaseous reaction of preheated titanium tetrachloride and preheated oxygen gas in the apparatus of FIG. 1. The particle inlet pipe of FIG. 2 is used. The dimensions of the parts of the apparatus are as follows:

| | |
|---|---|
| Inner diameter of burner | 38 mm |
| Outer diameter of burner | 89 mm |
| Inner diameter of outer tube of burner (1b) | 130 mm |
| Inner diameter at top of reaction chamber | 130 mm |
| Inner diameter at bottom of reaction chamber | 203 mm |
| Length of conical part of reaction chamber | 1200 mm |
| Length of cylindrical part of reaction chamber | 2500 mm |
| Inner diameter of outlet tube | 80 mm |
| Particles inlet pipe dimensions (FIG. 2): | |
| Inner diameter of part (1c) of outer part | 26 mm |
| Length of part (1b) of outer part | 30 mm |
| Inner diameter of part (1a) of outer part | 17 mm |
| Length of part (1a) of outer part | 30 mm |
| Diameter of cylinder of central rod | 6 mm |
| Length of conical part of central rod | 15 mm |
| Diameter of top conical part of central rod | 10 mm |

The titanium tetrachloride gas preheated at 1050°C was fed into the reaction chamber through the inner tube (1a) of the burner at a rate of 600 kg per hour. The titanium tetrachloride contained 0.8 wt% of aluminum chloride. The oxygen preheated at 1100°C was fed at a rate of 77.8 $m^3$ per hour through the oxygen feed pipe. The oxygen contained 3.0 volume % of moisture. Titania particles having a diameter of 0.84 mm – 2.83 mm at room temperature were fed at a rate of 72 kg per hour and air at room temperature was fed at a rate of 60 $m^3$ per hour through the particle inlet pipe. Chlorine gas at room temperature was fed at a rate of 84 m³ per hour through the pipe (6) and the gas inlet (6b) to the bottom of the reaction chamber. The resulting titanium dioxide was collected by a bag-filter after cooling. After 240 hours operation, no deposition of the resulting titanium dioxide on the wall of the reaction chamber was found. The size distribution of the resulting titanium dioxide particles was a weighted average of 0.22 $\mu$m with a standard deviation of 0.042 $\mu$m.

Having now fully described the invention, it will be apparent to one of ordinary skill in the art that many changes and modifications can be made thereto without departing from the spirit or scope of the invention as set forth herein.

What is claimed as new and intended to be covered by Letters Patent is:

1. In a process for producing titanium dioxide by the continuous gaseous oxidation of titanium tetrachloride or a titanium tetrachloride containing gas with oxygen or an oxygen containing gas, the improvement wherein both of said gases are separately preheated and the titanium tetrachloride or titanium tetrachloride containing gas is fed downwardly into the reactor from a burner equipped with a cooling jacket disposed at the upper part of the reactor and the oxygen or oxygen containing gas is fed downwardly through the burner into the reactor for reaction with titanium tetrachloride; and simultaneously, an inert gas and inert refractory particles are injected from the lower part of the reactor toward the inner wall of the reactor so that the inert refractory particles are caused to rise upwardly as a suspension, and the upward flow of the suspension is countercurrently contacted with the downward flow of the reaction product so as to rapidly cool the reaction product, the amount of inert refractory particles injected is more than 10 wt% based on the resulting titanium dioxide product, and wherein the inert gas does not substantially reach the reaction zone wherein said titanium tetrachloride is oxidized to titanium dioxide; and the inert refractory particles injected with the inert gas are raised into said reaction zone by inertia and impinge on the inner wall of the reactor so as to prevent the deposition of titanium dioxide.

2. The process according to claim 1, wherein oxygen or an oxygen containing gas is fed through an annular space between the outer wall of a titanium tetrachloride inlet tube and a cooling jacket.

3. The process according to claim 1, wherein part of the inert gas is injected from another nozzle disposed at the bottom of the reactor.

4. The process according to claim 1, wherein the nozzle for injecting the inert refractory particles has a rod having a conical head so as to inject the particles toward the inner wall of the reactor.

5. The process according to claim 1, wherein the inert refractory particles are sucked into the injection nozzle by a venturi effect.

* * * * *